(12) United States Patent
Breunig

(10) Patent No.: US 8,507,418 B2
(45) Date of Patent: Aug. 13, 2013

(54) SILOXANE-BASED COMPOSITION WHICH IS INTENDED FOR TIRE MOLDING/STRIPPING

(75) Inventor: Stefan Breunig, Villette de Vienne (FR)

(73) Assignee: Bluestar Silicones France SAS, Saint-Fons (FR)

( * ) Notice: Subject to any disclaimer, the term of this patent is extended or adjusted under 35 U.S.C. 154(b) by 706 days.

(21) Appl. No.: 11/993,784

(22) PCT Filed: Jun. 14, 2006

(86) PCT No.: PCT/FR2006/001343
§ 371 (c)(1),
(2), (4) Date: Feb. 4, 2009

(87) PCT Pub. No.: WO2007/003731
PCT Pub. Date: Jan. 11, 2007

(65) Prior Publication Data
US 2010/0043933 A1    Feb. 25, 2010

(30) Foreign Application Priority Data
Jun. 29, 2005 (FR) ..................... 05 06633

(51) Int. Cl.
*C10M 139/02* (2006.01)
*C10M 145/00* (2006.01)

(52) U.S. Cl.
USPC ........................................ 508/201; 508/591

(58) Field of Classification Search
USPC .................................................. 508/201, 591
See application file for complete search history.

(56) References Cited

U.S. PATENT DOCUMENTS

| | | | |
|---|---|---|---|
| 4,189,561 A * | 2/1980 | Burroway et al. | 526/318.25 |
| 4,431,452 A * | 2/1984 | Comper et al. | 106/38.22 |
| 4,840,742 A * | 6/1989 | Hoffman | 508/143 |
| 5,331,042 A * | 7/1994 | Charmot et al. | 524/556 |
| 6,825,153 B2 | 11/2004 | Giraud | |
| 2003/0114321 A1* | 6/2003 | Giraud et al. | 508/204 |
| 2006/0025517 A1 | 2/2006 | Guichard | |
| 2009/0053436 A1 | 2/2009 | Guichard | |

FOREIGN PATENT DOCUMENTS

| | | |
|---|---|---|
| EP | 0279372 A2 | 8/1998 |
| FR | 2801896 A1 | 6/2001 |
| FR | 2838447 A1 | 10/2003 |

OTHER PUBLICATIONS

"International Search Report," International Patent Application No. PCT/FR06/01343 (Nov. 7, 2006).

* cited by examiner

*Primary Examiner* — Jim Goloboy
(74) *Attorney, Agent, or Firm* — Baker Donelson Bearman Caldwell & Berkowitz, PC

(57) ABSTRACT

The invention relates to compositions in the form of silicone oil emulsions which are intended to be applied to curing bladders as a mold-release agent during tire production.

18 Claims, No Drawings

SILOXANE-BASED COMPOSITION WHICH IS INTENDED FOR TIRE MOLDING/STRIPPING

CROSS REFERECE TO RELATED APPLICATIONS

This is a §371 National Stage Application of PCT/FR2006/001343 filed Jun. 14, 2006, that claims priority from French Patent Application No. 0506633 filed Jun. 29, 2005.

BACKGROUND OF THE INVENTION

1. Field of the Invention

The present invention relates to compositions in the form of a silicone oil emulsion, which are intended to be applied to curing bladders and/or to pneumatic or semi-pneumatic tires, to make molding/mold stripping easier during the manufacture of tires.

The invention relates in particular to an application as a lubricating composition particularly appropriate for the lubrication of curing bladders used during the shaping and curing of pneumatic or semi-pneumatic tires.

The invention also relates to the curing bladders coated with a lubricating composition and/or an adhesion primer according to the invention and to the pneumatic or semi-pneumatic tires coated with said lubricating composition.

According to two of its other aspects, the invention relates to a method of preparing lubricating compositions of the invention and to the use of said lubricating compositions for the lubrication of curing bladders.

2. Description of Related Art

Rubber tires for vehicles are conventionally manufactured by molding and curing a green, or uncured and unshaped, tire in a molding press in which the green tire is pressed toward the outside against the surface of a mold by means of a bladder that can be inflated by an internal fluid. By this method, the green (i.e. uncured) tire is shaped against the external surface of the mold, which defines the tread pattern of the tire and the configuration of the sidewalls. By applying heat, the tire is cured. In general, the bladder is inflated by the internal pressure provided by a fluid, such as a hot gas, hot water and/or steam, which also participates in the transfer of heat for the curing operation. The tire is then left to cool down slightly in the mold, this cooling being sometimes promoted by introducing cold or cooler water into the bladder. The mold is then opened, the bladder is deflated, by releasing the pressure of the internal fluid, and the tire is removed from the tire mold. This use of tire-curing bladders is well known in the art.

It is recognized that there is substantial relative movement between the external contact surface of the bladder and the internal surface of the tire during the bladder inflation phase before complete curing of the tire. Likewise, there is also considerable relative movement between the external contact surface of the bladder and the cured internal surface of the tire, after the tire has been molded and cured, during deflation of the bladder and its extraction from the tire.

Unless adequate lubrication is provided between the bladder and the internal surface of the tire, the bladder generally has a tendency to buckle, resulting in a misshaping of the tire in the mold and also excessive wear and roughening of the bladder surface itself. The bladder surface also tends to stick to the internal surface of the tire after the tire has been cured and during that part of the tire curing cycle when the bladder is being deflated. Furthermore, air bubbles may be trapped between the surface of the bladder and that of the tire, and promote the appearance of tire curing defects resulting from inadequate heat transfer.

For this reason, the external surface of the bladder or the internal surface of the green or uncured tire is coated with a suitable lubricant, sometimes referred to by the name "lining cement".

Many lubricating compositions have been proposed for this purpose in the art.

In particular, lubricating compositions described in Patent Application FR 2 494 294 are known, which contain, as principal constituents, a reactive polydimethylsiloxane preferably having terminal hydroxyl groups, a crosslinking agent preferably comprising Si—H functional groups, and optionally a polycondensation catalyst.

U.S. Pat. No. 3,872,038 describes an internal mold release agent for tires, based on a silicone emulsion and a filler, for example mica, to ensure air can escape effectively. Instead of a reactive system, a silicone gum is used to keep the filler on the surface of the rubber after application. This formulation allows the air trapped between the bladder and the green tire to escape, but does not allow several mold stripping operations to be carried out.

Usually, the inflatable bladders, before being coated on their external surface (that which will come into contact with the tire) with a lubricating composition, may undergo a pretreatment consisting in applying a uniform layer of a composition called a "primer" or an "adhesion primer".

SUMMARY OF THE INVENTION

The objective of the present invention is therefore to provide improved aqueous lubricating compositions that also have excellent slip and durability characteristics, which makes them perfectly suitable for lubricating the bladders used when curing pneumatic and semi-pneumatic tires.

These compositions make it possible to strip several tires per application to ensure good performance in terms of lubrication but also in terms of air escape, thus preventing the formation of air bubbles trapped between the bladder surface and the tire surface, and consequently the appearance of curing defects in the tires resulting from inadequate heat transfer.

In general, the subject of the invention is a lubricating composition in the form of an oil-in-water emulsion, based on a polyorganosiloxane that can be polymerized and/or crosslinked by dehydrogeno-condensation, comprising:

(a) at least one reactive polyorganosiloxane (A) comprising at least two OH groups per molecule and having a dynamic viscosity of between 50 and $3 \times 10^6$ mPa·s, preferably between 500 and $2 \times 10^6$ mPa·s and even more preferably between 700 and $1.5 \times 10^6$ mPa·s at 25° C.;

(b) at least one crosslinking agent (B) having, per molecule, at least three reactive units ≡SiH;

(c) at least one organic polymer latex (C) coming from the (co)polymerization:
   of at least one vinyl monomer selected from the group formed by: styrene, o-methylstyrene and a vinyltoluene,
   of at least one alkyl(meth)acrylate monomer and
   optionally, of at least one ethylenically unsaturated monocarboxylic or dicarboxylic acid monomer;

(d) at least one air-removing agent (D), such as a mica, a talc or carbon black, preferably a mica;

(e) at least one surfactant (E);

(f) optionally, at least one unreactive linear polyorganosiloxane oil (F) having a dynamic viscosity of around 50 to 100 000 mPa·s at 25° C. and consisting of a linear homopolymer or copolymer in which, per molecule, the monovalent organic substituents, whether identical or different from one another, linked to the silicon atoms, are selected from the group formed by alkyl, cycloalkyl, alkenyl, aryl and alkylaryl radicals;
(g) optionally, at least one additive (G) selected from the group formed by: a film-forming polymer thickening agent, a complementary lubricant, an antifriction agent, a coalescence agent, a wetting or dispersing agent, a mineral filler, an antifoam agent, a thickener, a stabilizer, an acidifying agent, a biocide and an antifungal agent;
(h) optionally, at least one dehydrogeno-condensation catalyst; and
(i) water,
the amounts of surfactant(s) and water being sufficient to obtain an oil-in-water emulsion.

The organic polymer latex (C) results from the emulsion (co) polymerization:
of at least one vinyl monomer selected from the group formed by: styrene, o-methylstyrene and a vinyltoluene;
of at least one alkyl(meth)acrylate monomer; and
optionally, of at least one ethylenically unsaturated monocarboxylic or dicarboxylic acid monomer.

DETAILED DESCRIPTION OF A PREFERRED EMBODIMENT

The latices are prepared by a (co)polymerization reaction that is carried out in a manner known per se, in aqueous emulsion and in the presence of at least one radical initiator with a monomer concentration in the reaction medium generally between 20 and 60% by weight. Any conventional initiator or free-radical initiator used in radical polymerization may be suitable.

Examples of initiators comprise hydroperoxides, such as hydrogen peroxide and diisopropylbenzene hydroperoxide, sodium, potassium or ammonium persulfates and cationic initiators such as azobis(isobutyronitrile).

These initiators may be combined with a reducing agent, such as for example disulfite. The amount generally lies between 0.05 and 2% by weight relative to the amount of monomers.

The polymerization temperature, which depends on the initiator used, is generally between 50° C. and 100° C., preferably between 70° C. and 90° C. In the case in which the polymerization is carried out in aqueous emulsion, the particles are stabilized, if necessary, by any known colloidal stabilization system, such as anionic, cationic, amphoteric and nonionic emulsifiers. The polymerization may be carried out continuously, or in batch mode, or semi-continuously with part of the monomers being continuously introduced, or may be of the "seeded" or "incremental" type according to any known variant for obtaining particles of homogeneous structure and particles of heterogeneous structure.

Examples of commercially available latices are, for example, styrene/alkyl acrylate or styrene/alkyl acrylate/acrylic acid copolymers of the RHODOPAS® range (for example RHODOPAS® DS910, RHODOPAS® DS2800, RHODOPAS® DS1003, RHODOPAS® DS2818 and RHODOPAS® DS2810 sold by Rhodia), styrene/alkyl acrylate latices of the LIPATON® range sold by Polymer Latex and styrene/alkyl acrylate or styrene/alkyl acrylate/acrylic acid copolymers of the UCAR® latex range sold by Dow Chemical.

Advantageously, the latex is chosen from styrene/alkyl acrylate or styrene/alkyl acrylate/acrylic acid copolymers of the RHODOPAS® range.

According to a first preferred embodiment, the organic polymer latex (C) comes from the polymerization:
of at least one alkyl(meth)acrylate monomer selected from the group formed by: methyl (meth)acrylate, ethyl or hydroxyethyl(meth)acrylate, propyl or hydroxypropyl (meth)acrylate, butyl or hydroxybutyl(meth)acrylate and 2-ethylhexyl (meth)acrylate;
of a styrene monomer; and
optionally, of at least one monomer selected from the group formed by: acrylic acid and methacrylic acid.

According to a second embodiment, the organic polymer latex (C) comes from the polymerization:
of at least one alkyl(meth)acrylate monomer selected from the group formed by: methyl (meth)acrylate, ethyl (meth)acrylate, propyl (meth)acrylate and butyl(meth) acrylate;
of a styrene monomer; and
optionally, of at least one monomer chosen from the group formed by: acrylic acid, methacrylic acid, maleic acid, fumaric acid and itaconic acid.

According to a third embodiment, the organic polymer latex is selected from: styrene/butyl acrylate/acrylic acid copolymers with the following weight ratios relative to the total weight of the copolymer:
styrene monomer: between 25 and 55% by weight;
butyl acrylate monomer: between 74.5 and 40% by weight; and
acrylic acid monomer: between 0.5 and 5% by weight.

The term "dynamic viscosity" is understood within the context of the invention to mean the Newtonian viscosity, that is to say the dynamic viscosity measured in a manner known per se at a given temperature and with a shear rate low enough for the measured viscosity to be independent of the rate.

As preferred constituent, the reactive polyorganosiloxane (A) comprises the following siloxyl units:

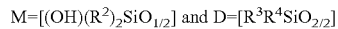

$M=[(OH)(R^2)_2SiO_{1/2}]$ and $D=[R^3R^4SiO_{2/2}]$ in which:
$R^2$, $R^3$ and $R^4$ are identical or different radicals selected from the group formed by: $C_1$-$C_6$ linear or branched alkyl radicals (such as for example methyl, ethyl, propyl, isopropyl, butyl, isobutyl, t-butyl, n-pentyl and n-hexyl), $C_3$-$C_8$ cycloalkyl radicals (such as for example cyclopentyl and cyclohexyl), $C_6$-$C_{10}$ aryl radicals (such as for example phenyl and naphthyl) and $C_6$-$C_{15}$ alkylarylene radicals (such as for example tolyl and xylyl).

Among the preferred constituents for the reactive polyorganosiloxane (A), mention may be made of linear polyorganosiloxanes of formula:

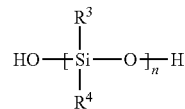

in which n is an integer greater than or equal to 50 and $R^3$ and $R^4$, which are identical or different, represent: a $C_1$-$C_6$ alkyl; a $C_3$-$C_8$ cycloalkyl; a $C_2$-$C_8$ alkenyl; a $C_5$-$C_8$ cycloalkenyl, an aryl, an alkylarylene or an arylalkylene, each of the aforementioned radicals being optionally substituted with a halogen (preferably fluorine) atom or a cyano residue.

The oils most commonly used, owing to their availability in industrial products, are those for which $R^3$ and $R^4$ are independently selected from the group of radicals formed by: a methyl, an ethyl, a propyl, an isopropyl, a cyclohexyl, a vinyl, a phenyl and a 3,3,3-trifluoropropyl. Very preferably, at least about 80% by number of these radicals are methyl radicals.

In accordance with the invention, it will however be preferable to start with polyorganosiloxane oils A that are already polymerized for the preparation of the emulsion, using for example the silicone phase emulsification techniques described in FR-A-2 697 021.

According to a preferred embodiment of the invention, the reactive polyorganosiloxane (A) is an α,ω-dihydroxypolydimethylsiloxane.

Preferably, the crosslinking agent (B) is selected from those that possess at least one unit of formula (II) and that are terminated by units of formula (III), or cyclic ones consisting of units of formula (II) shown below:

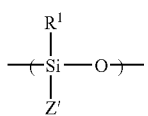
(II)

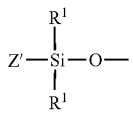
(III)

in which:
the symbols $R^1$ are identical or different and represent:
a linear or branched alkyl radical containing 1 to 8 carbon atoms, optionally substituted with at least one halogen, preferably fluorine, the alkyl radicals being preferably methyl, ethyl, propyl, octyl or 3,3,3-trifluoropropyl radicals,
a cycloalkyl radical containing between 5 and 8 cyclic carbon atoms, optionally substituted, or
an aryl radical containing between 6 and 12 carbon atoms, optionally substituted, an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms;
the symbols Z' are similar or different and represent:
a hydrogen radical or
a group satisfying the same definition as that given above for $R^1$, with, per molecule, at least three of the symbols Z' representing H.

As examples of crosslinking agent (B), mention may be made of the compound of following formula (IV):

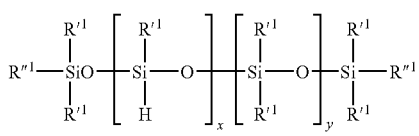
(IV)

in which:
x represents an integer or fractional number varying between 1 and 10 000;
y represents an integer or fractional number varying between 0 and 10 000;

$R'^1$ and $R'''^1$ represent, independently of each other:
a linear or branched alkyl radical containing 1 to 8 carbon atoms, optionally substituted with at least one halogen, preferably fluorine, the alkyl radicals being preferably methyl, ethyl, propyl, octyl and 3,3,3-trifluoropropyl,
a cycloalkyl radical containing between 5 and 8 cyclic carbon atoms, which is optionally substituted,
an aryl radical containing between 6 and 12 carbon atoms, which is optionally substituted and
an aralkyl part having an alkyl part containing between 5 and 14 carbon atoms and an aryl part containing between 6 and 12 carbon atoms, which is optionally substituted on the aryl part;
$R'''^1$ possibly also corresponding to hydrogen; and
with the condition whereby the polyorganosiloxane comprises at least three reactive units ≡SiH.

As crosslinking agent (B), the following compounds are particularly suitable for the invention:

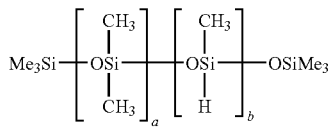
S1

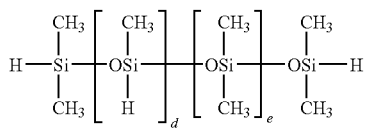
S2 with a, b, c, d and e representing a varying number:
in the polymer of formula S1:
$0 \leq a \leq 10000$, preferably $0 \leq a \leq 8000$ and preferably $0 \leq a \leq 5000$; and
$3 \leq b \leq 10000$, preferably $10 \leq b \leq 100$ and preferably $30 \leq b \leq 55$;
in the polymer of formula S2:
$1 \leq d \leq 10000$, preferably $20 \leq d \leq 60$; and
$0 \leq e \leq 10000$, preferably $0 \leq e \leq 1000$.

Within the context of the invention, the term "unreactive oil" is understood to mean an oil which, under the conditions for emulsifying and preparing the lubricating composition and the use conditions, does not react chemically with any of the constituents of the composition.

As constituent (f), the unreactive linear polyorganosiloxane oil (F) has a dynamic viscosity of around 50 to 100 000 mPa·s at 25° C. By way of example, mention may be made of linear polyorganosiloxanes:
consisting, along each chain:
of units of formula $R^5R^6SiO_{2/2}$, optionally combined with units of formula $(R^5)_2SiO_{2/2}$,
of units of formula $(R^6)_2SiO_{2/2}$, optionally combined with units of formula $(R^5)_2SiO_{2/2}$,
of units of formula $R^5R^6SiO_{2/2}$ and units of formula $(R^6)_2SiO_{2/2}$, optionally combined with units of formula $(R^5)_2SiO_{2/2}$; and
which are blocked at each chain end by a unit of formula $(R^7)_3SiO_{1/2}$, the identical or different radicals $R^7$ of which are chosen from the radicals $R^5$ and $R^6$;

where the radicals $R^5$ and $R^6$, monovalent organic substituents of the various siloxyl units mentioned above, have the following definitions:

the radicals $R^5$, which are identical to or different from one another, are selected from: $C_1$-$C_6$ linear or branched alkyl radicals (such as for example methyl, ethyl, propyl, isopropyl, butyl, isobutyl, t-butyl, n-pentyl, n-hexyl), $C_3$-$C_8$ cycloalkyl radicals (such as for example cyclopentyl and cyclohexyl) and $C_2$-$C_8$ linear or branched alkenyl radicals (such as for example vinyl and allyl) and the radicals $R^6$, which are identical to or different from one another, are selected from: $C_6$-$C_{10}$ aryl radicals (such as for example phenyl and naphthyl), $C_6$-$C_{15}$ alkylarylene radicals (such as for example tolyl and xylyl) and $C_6$-$C_{15}$ arylalkylene radicals (such as for example benzyl).

Preferably, the lubricating composition according to the invention comprises:

1 to 30 parts by weight and preferably 3 to 15 parts by weight of constituent (a);
1 to 30 parts by weight of constituent (b);
0.1 to 10 parts by weight of constituent (c);
3 to 25 parts by weight of constituent (d);
0.5 to 10 parts by weight of constituent (e);
0 to 30 parts by weight of constituent (f);
0 to 30 parts by weight of constituent (g);
0 to 10 parts by weight of constituent (h); and
20 to 60 parts by weight of constituent (i),
per 100 parts by weight of the sum of constituents (a) to (i).

The dehydrogeno-condensation catalyst may be present in the composition according to the invention. Its presence is only optional owing to the temperatures encountered within the context of the application. Examples of dehydrogeno-condensation catalysts that can be used within the context of the invention are organometallic salts, and titanates such as tetrabutyl orthotitanate. As organometallic salts, mention may be made of zirconium naphthenate and zirconium octylate. It is also possible to use a catalytic tin compound, generally an organotin salt. The organotin salts that can be used are described in particular in the work by Noll, Chemistry and Technology of Silicones, Academic Press (1968), page 397. It is also possible to define, as catalytic tin compound, either distannoxanes or polyorganostannoxanes, or the product of the reaction of a tin salt, in particular a tin dicarboxylate, on an ethyl polysilicate, as described in the U.S. Pat. No. 3,862,919.

The product resulting from the reaction of an alkyl silicate or an alkyltrialkoxysilane on dibutyltin diacetate, as described in Belgian Patent BE-A-842 305, may also be suitable.

According to another possibility, a tin II salt, such as $SnCl_2$ or stannous octoate, may be used. The catalyst may be a tin salt of an organic acid, such as dibutyltin diacetate, dibutyltin dilaurate, dioctyltin dilaurate, dibutyltin dioctate, zinc naphthenate, cobalt naphthenate, zinc octylate, cobalt octylate and dioctyltin di(isomercaptoacetate). Examples of tin salts such as tin bis-chelates are described in Patent Applications EP-A-147 323 and EP-A-235 049, diorganotin dicarboxylates and, in particular, catalysts are described in British Patent GB-A-1 289 900 (dibutyltin or dioctyltin diacetate and dibutyltin or dioctyltin dilaurate).

The dehydrogeno-condensation catalyst, when it is present, is generally introduced into the emulsion in an amount of 0.05 to 5 parts by weight relative to the total weight of the emulsion.

The nature of the surfactant (E) will be easily determined by a person skilled in the art, the objective being to prepare a stable emulsion. Anionic, cationic, nonionic and zwitterionic surfactants may be employed, by themselves or as a mixture.

As anionic surfactants, mention may be made of alkali metal salts of sulfonic aromatic hydrocarbon acids or alkali metal salts of alkylsulfuric acids. Nonionic surfactants are more particularly preferred within the context of the invention. Among these, mention may be made of alkyl or aryl ethers of polyalkylene oxides, polyethoxylated sorbitan hexastearate, polyethoxylated sorbitan oleate having a saponification number of 102 to 108 and a hydroxyl number of 25 to 35, and cetyl stearyl and polyethylene oxide ethers.

As arylic ethers of polyalkylene oxides, mention may be made of polyethoxylated alkylphenols. As alkyl ethers of polyalkylene oxides, mention may be made of the isodecyl ether of polyethylene glycol and the trimethylnonyl ether of polyethylene glycol containing 3 to 15 ethylene oxide units per molecule.

Mention may also be made of ethoxylated isotridecyl alcohol, e.g. with 8 to 9 mol of ethylene oxide per mole of isotridecyl alcohol.

The amount of surfactant depends on the type of each of the constituents present and on the actual nature of the surfactant used. As a general rule, the emulsion comprises 0.5 to 10% by weight (better still 0.5 to 7% by weight) of surfactant relative to the total weight of the emulsion.

The presence of a reactive silicone system also helps in the homogeneous dispersion of the air-removing agent (D). Thus, when mica is used, it is unnecessary to subject it to a surface treatment since the hydrophobization of the mica takes place in situ in the composition. This in situ hydrophobization helps to keep the filler finely dispersed and to stabilize the emulsion. The size of the mica particles is preferably less than 500 μm, preferably less than 100 μm. The mica is preferably a wet ground mica.

The emulsion may also contain one or more additives (G), which are additional ingredients such as for example complementary lubricants, antifriction agents, coalescence agents, wetting or dispersing agents, mineral fillers, antifoam agents, thickeners, stabilizers and preservatives, such as biocides and antifungal agents, in amounts that may vary considerably, for example, between 0.2 and 30% by weight of the emulsion.

Examples of thickeners are cellulosic thickeners (carboxymethylcellulose), acrylic thickeners, polyurethane, hydrocolloidal gums (xanthan gum) and mixtures thereof.

As coalescence agents, it is possible to use glycols and/or aliphatic petroleum cuts (petroleum distillation fractions).

Wetting or dispersible agents that can be used within the context of the invention are for example phosphates, such as for example sodium hexametaphosphate, polyethylene glycols (PEG), etc.

The compositions of the invention may be conventionally prepared by using the conventional methods of the prior art.

The emulsification may be direct emulsification or inverse emulsification.

In the case of direct emulsification, the method consists in emulsifying a mixture of constituents (a), (b) and (f) in an aqueous phase containing the surfactant. An oil-in-water emulsion is obtained directly. The missing constituents may then be added, either directly to the emulsion (in the case of water-soluble constituents) or subsequently in the form of an emulsion (in the case of constituents soluble in the silicone phase).

The particle size of the emulsion obtained above may be adjusted by conventional methods known to those skilled in the art, especially by continuing the stirring in the reactor for a suitable time.

Ordinarily, the methods of the invention are carried out at ambient temperature. Preferably, the rise in temperature that may result from the grinding or stirring steps is limited. In particular, it is chosen to make the temperature remain below 60 or 65° C.

Constituents (a) to (i) are commercially available or easily obtainable to a person skilled in the art by carrying out conventional methods described in the prior art.

The subject of the invention is also the use of the lubricating composition thus obtained for the lubrication of various articles.

More particularly, the invention relates to the use of the lubricating composition for the lubrication of the inflatable curing bladder, preferably made of rubber or the like, during the shaping and curing of pneumatic or semi-pneumatic tires. The lubricating composition of the invention may be applied in any manner, for example by spraying, by brushing or by using a sponge or a brush. It is preferable to cover the article to be coated with a uniform coating layer.

The lubrication of the curing bladder used when shaping and curing pneumatic or semi-pneumatic tires may be carried out in two different ways.

During the manufacture of pneumatic or semi-pneumatic tires, a green tire is placed in a tire mold, an inflatable bladder is placed in the mold, the mold is closed and the bladder is inflated by applying internal pressure from a hot fluid, in such a way that the tire is pressed against the mold, shaped and cured. The mold is then opened, the bladder is deflated and the shaped and cured tire is recovered. The same bladder is used for manufacturing about a few hundred tires.

The inflatable rubber bladder used when manufacturing the tires is initially coated with a lubricating composition according to the invention.

At the start, lubrication of the bladder is direct. Thereafter, the lubricating effect of this bladder becomes depleted.

During this subsequent phase, it is the internal surface of the tire (that which will come into contact with the bladder) which is coated with the lubricating composition. There is regeneration of the rubber bladder lubrication by transfer from the tire.

In general, the mold pressing/bladder removal cycles carried out during the manufacture of tires proceed in succession in the following manner:
 the bladder may be initially coated with the lubricating composition (direct lubrication) and heated between 80 and 180° C., preferably between 130 and 170° C., inside the press or outside it. The bladder is then used (without further coating of the bladder, but producing a coating on the first tire) for a time corresponding to 5 to 10 cycles (each cycle resulting in the manufacture of a different tire); then
 the following cycles are carried out by using this same bladder (for which the lubricating coating is depleted) from pneumatic or semi-pneumatic tires that are then each time coated with the lubricating composition of the invention: the lubrication of the bladder takes place in this case by transfer.

It is also possible not to treat the bladder during its 1st use, and in this case the lubricating composition is applied to the inner surface of the first two green tires.

The present invention thus also relates to the use of the lubricating composition for the lubrication of green pneumatic or semi-pneumatic tires, which may or may not comprise, on their external surface, elements that will constitute the external tread intended to come into contact with the ground.

The lubricating composition of the invention furthermore exhibits excellent slip, durability and elasticity properties.

The present invention also relates to the articles lubricated using the lubricating composition that can be obtained by implementing the method that has just been described above.

More particularly, the invention relates to:
 an inflatable rubber bladder coated on its external surface with a composition according to the invention, for the shaping and curing of pneumatic or semi-pneumatic tires;
 an inflatable rubber bladder that can be obtained by heating the inflatable bladder defined above, especially to 80-180° C. (preferably 130-170° C.), so as to completely crosslink the crosslinkable constituents of the emulsion; and
 a green pneumatic or semi-pneumatic tire, which may or may not comprise elements that will constitute its external tread intended to come into contact with the ground, said tire being coated on its internal surface with a lubricating composition according to the invention.

The following examples that illustrate the invention testify to the excellent lubricating properties of the compositions of the invention.

EXAMPLE 1

The % values indicated below are by weight relative to the total weight of the composition.
Preparation of a Composition A According to the Invention:
 Introduced into a mixer were water (40.65% by weight), an antifoam (Silicex®141, supplied by Rhodia, 0.2% by weight), a biocide (0.15% by weight), a PEG 300 polyethylene glycol (0.95% by weight), a mica (8.64% by weight, 39 µm particle size), a Rhéozan® thickener (0.235% by weight) with a Trycol®5950 wetting agent (0.7% by weight). After homogenization, the following were introduced:
 an emulsion (12.535% by weight) based on an α,ω-dihydroxypolydimethylsiloxane oil of 135000 mPa·s viscosity (40% solids); and
 a styrene/butyl acrylate/acrylic acid latex in the form of a Rhodopas® DS2800 emulsion (7.00% by weight, sold by Rhodia), acetic acid (0.08% by weight) and an emulsion (28.46% by weight) comprising a mixture of a polydimethylhydrogenosiloxane of formula $MD'_{50}M$ (using a nomenclature known to those skilled in the art in the field of silicones) and a polydimethylsiloxane of 100 mPa·s viscosity. After homogenization, the Silicex®120 antifoam (0.4% by weight, supplied by Rhodia) was added and the emulsion (A) was thus obtained.
Preparation of a Composition B (Comparative Composition, with no Mica):
 Introduced into a mixer were water (46.865%), the Silicex®141 antifoam (0.2% by weight), a biocide (0.15% by weight), the Rhéozan® thickener (0.235% by weight) with a Trycol®5950 wetting agent. After homogenization, the following were introduced:
 an emulsion (15.91% by weight) based on an α,ω-dihydroxypolydimethylsiloxane oil of 135000 mPa·s viscosity (40% solids); and
 a styrene/butyl acrylate/acrylic acid latex in the form of a Rhodopas® DS2800 emulsion (7.00% by weight, sold by Rhodia), acetic acid (0.08% by weight) and an emulsion (28.46% by weight) comprising a mixture of a polydimethylhydrogenosiloxane of formula $MD'_{50}M$ (using a nomenclature known to those skilled in the art in the field of silicones) and a polydimethylsiloxane of 100 mPa·s viscosity. After homogenization, the Silicex®120 antifoam (0.4% by weight, supplied by Rhodia) was added and the emulsion (B) was thus obtained.

Preparation of a Composition (Comparative Composition C, Containing no Latex):

Introduced into a mixer were water (34.465% by weight), an antifoam (0.2% by weight, Silicex®141, supplied by Rhodia), a biocide (0.15% by weight), a PEG 300 polyethylene glycol (1.87% by weight), a mica (17.28% by weight, 39 µm particle size), a Rheozan® thickener (0.235% by weight) with a Trycol®5950 wetting agent (0.7% by weight). After homogenization, the following were introduced:

an emulsion (12.535% by weight) based on an α,ω-dihydroxypolydimethylsiloxane oil of 135000 mPa·s viscosity (40% solids); and acetic acid (0.08% by weight) and an emulsion (28.46% by weight) comprising a mixture of a polydimethylhydrogenosiloxane of formula $MD'_{50}M$ and a polydimethylsiloxane of 100 mPa·s viscosity. After homogenization, the Silicex®120 antifoam (0.4% by weight, supplied by Rhodia) was added and the emulsion (A) was thus obtained.

These emulsions were evaluated by application tests and in actual cases of tire production.

Description of the Tests:

Mold stripping Test:

Preparation of a bladder rubber sheet measuring 3 mm×150 mm×150 mm in a press heated to 200° C. for 30 minutes. The sheet was structured on the surface in order to simulate the surface of a bladder. The sheet was painted with the mold release agent in a paint booth, by spraying it using compressed air. A layer about 20 µm in thickness was deposited. After drying in air, the assembly was cured at 170° C. for 10 minutes.

The sheet was then placed in a metal mold in a press and the platens were heated to 170° C. The sheet was left to preheat for 20 minutes and then pieces of green ILR (Inner Liner Rubber, i.e. rubber constituting the internal surface of a tire) were deposited, in four places, on the sheet coated with the mold release agent. The mold was closed, followed by the press, and the ILR was left to cure for 10 minutes. The mold was opened and the thin molded ILR sheets removed. In order to consider mold stripping to be successful, the sheets must be separated without any force, nor with any sticking. Otherwise, the mold stripping is recorded as a failure.

The number of mold stripping operations corresponds to the number of ILR sheets stripped without sticking.

Lubrication Test:

This test evaluates the lubricating power of the mold release agents.

A sheet of bladder rubber was prepared as mentioned above (dimensions: 2×7×19.5 mm$^3$, smooth surface).

A sheet of ILR rubber with dimensions of 2×5×11.5 mm$^3$ was prepared in a press heated to 170° C. for 10 minutes.

The sheet of bladder rubber was treated with 300 mg of mold release agent by applying it using a brush. The product was cured at 170° C. for 10 minutes in an oven.

The sheet of treated bladder rubber was bonded to a horizontal metal support.

The sheet of ILR rubber loaded with 6.78 kg was pulled by a tensile testing machine. The force was recorded.

The friction coefficient was determined by dividing the force needed to pull the ILR rubber sheet loaded by the weight of the load.

The number of passes for which $k_d$ remains below 0.5 was recorded.

Loss Test:

Operating method similar to the mold stripping test. The amount of product transferred onto the sheet of ILR rubber was determined. The weight of product transferred onto the ILR rubber sheet was divided by the area of the ILR specimen. These results in mg/cm$^2$ were divided by the initial thickness of the layer of mold release agent. The transfer in % was obtained. The higher the amount of transfer, the less mold release agent remains available for the next mold stripping operation.

Results:

TABLE 1

| Product | A (Invention) | B (Comparative, no mica) | C (Comparative, no latex) |
|---|---|---|---|
| "Number of mold stripping operations" test, ignoring defects (bubbles) | 6 | 10 | 4 |
| "Lubrication" test ($k_d$ < 0.5) | 8 | 6 | 6 |
| Loss test [%] | 9.1 | 7.7 | 30.8 |
| Actual test on a tire of 195/55/15H size: Number of defect-free mold stripping operations | 7 | 2 | — |
| Actual test on tires of 205/55/16W size: Number of defect-free mold stripping operations | 6 | 2 | — |

The mold release agent (A) according to the invention makes it possible to strip a maximum number of tires without any defects. No defects due to poor air escape were observed.

Product B, containing no mica, is limited as regards the number of defect-free mold stripping operations.

Specimen C, containing no latex according to the invention, shows, during the first mold stripping operation, a much greater loss of product than specimen A containing the latex according to the invention, hence the smaller number of passes possible in the lubrication test and the smaller number of mold stripping operations possible.

The use of an organic polymer latex (C) combined with an air-removing agent (D) in a composition according to the invention makes it possible to obtain a mold release agent that ensures that air escapes effectively, with a large number of possible mold stripping operations per application. The specific latex according to the invention makes it possible for the mica, responsible for good air escape performance, to be lastingly fixed in the matrix of the mold release agent, which may then be termed a semi-permanent (multi-release) mold release agent.

The invention claimed is:

1. A lubricating composition in the form of an oil-in-water emulsion, based on a polyorganosiloxane that can be polymerized and/or crosslinked by dehydrogeno-condensation, comprising:

(a) at least one reactive polyorganosiloxane (A) comprising at least two OH groups per molecule and having a dynamic viscosity of from 50 to 3×10$^6$ mPa·s, at 25° C.;

(b) at least one crosslinking agent (B) having, per molecule, at least three reactive units ≡SiH;

(c) at least one organic polymer latex (C), selected from the group consisting of styrene/butyl acrylate/acrylic acid copolymers with the following weight ratios relative to total weight of copolymer:

styrene monomer: from 25 to 55% by weight;

butyl acrylate monomer: from 74.5 to 40% by weight; and
acrylic acid monomer: from 0.5 to 5% by weight;
(d) mica (D), wherein said mica has a particle size of less than 500 μm;
(e) at least one surfactant (E);
(f) optionally, at least one unreactive linear polyorganosiloxane oil (F) having a dynamic viscosity of around 50 to 100000 mPa·s at 25° C. and comprising a linear homopolymer or copolymer in which, per molecule, the monovalent organic substituents, whether identical or different from one another, linked to the silicon atoms, are selected from the group consisting of alkyl, cycloalkyl, alkenyl, aryl and alkylaryl radicals;
(g) optionally, at least one additive (G) selected from the group consisting of a film-forming polymer thickening agent, a complementary lubricant, an antifriction agent, a coalescence agent, a wetting or dispersing agent, a mineral filler, an antifoam agent, a thickener, a stabilizer, an acidifying agent, a biocide and an antifungal agent;
(h) at least one dehydrogeno-condensation catalyst; and
(i) water,
the amounts of surfactant and water being sufficient to obtain an oil-in-water emulsion and wherein the constituents (a) to (i), if present in the composition, are found in amounts comprising
1 to 30 parts by weight of constituent (a);
1 to 30 parts by weight of constituent (b);
0.1 to 10 parts by weight of constituent (c);
3 to 25 parts by weight of constituent (d);
0.5 to 10 parts by weight of constituent (e);
0 to 30 parts by weight of constituent (f);
0 to 30 parts by weight of constituent (g); and
20 to 60 parts by weight of constituent (i),
per 100 parts by weight of a sum of constituents (a) to (i).

2. A lubricating composition as claimed in claim 1, wherein the crosslinking agent (B) is selected from the group consisting of agents that possess at least one unit of formula (II) and that are terminated by units of formula (III), and cyclic agents comprising units of formula (II):

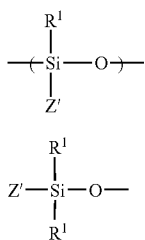

in which:
the symbols $R^1$ are identical or different and represent:
a linear or branched alkyl radical containing 1 to 8 carbon atoms, optionally substituted with at least one halogen,
a cycloalkyl radical containing between 5 and 8 cyclic carbon atoms, optionally substituted, or
an aryl radical containing between 6 and 12 carbon atoms, optionally substituted,
an aralkyl part having an alkyl part containing between 5 and 14 carbon atoms and an aryl part containing between 6 and 12 carbon atoms, which is optionally substituted on the aryl part with halogens, alkyls and/or alkoxyls containing 1 to 3 carbon atoms;
the symbols Z' are similar or different and represent:
a hydrogen radical or
a group satisfying the same definition as that given above for $R^1$, with, per molecule, at least three of the symbols Z' representing H.

3. A lubricating composition as claimed in claim 1, wherein the reactive polyorganosiloxane (A) comprises the following siloxyl units:

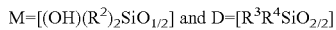

in which:
$R^2$, $R^3$ and $R^4$ are identical or different radicals selected from the group consisting of $C_1$-$C_6$ linear or branched alkyl radicals, $C_3$-$C_8$ cycloalkyl radicals, $C_6$-$C_{10}$ aryl radicals and $C_6$-$C_{15}$ alkylarylene radicals.

4. A lubricating composition as claimed in claim 1, wherein the reactive polyorganosiloxane (A) is an α,ω-dihydroxypolydimethylsiloxane.

5. An article coated with a composition as claimed in claim 1.

6. An article that can be obtained by heating an article as claimed in claim 5.

7. An inflatable rubber bladder coated on an external surface thereof with a composition as claimed in claim 1, for the shaping and/or curing of pneumatic or semi-pneumatic tires.

8. An inflatable rubber bladder that can be obtained by heating a bladder as claimed in claim 7 to a temperature of 80 to 180° C.

9. A green pneumatic or semi-pneumatic tire comprising an element that will constitute an external tread thereof intended to come into contact with the ground, said tire being coated on an internal surface thereof with a composition as claimed in claim 1.

10. A method for lubricating an article comprising employing a composition according to claim 1.

11. A method of claim 10 wherein said method is employed during the shaping and curing of pneumatic or semi-pneumatic tires, for the lubrication of an inflatable rubber curing bladder.

12. A lubricating composition as claimed in claim 1, comprising:
3 to 15 parts by weight of constituent (a);
1 to 30 parts by weight of constituent (b);
0.1 to 10 parts by weight of constituent (c);
3 to 25 parts by weight of constituent (d);
0.5 to 10 parts by weight of constituent (e);
0 to 30 parts by weight of constituent (f);
0 to 30 parts by weight of constituent (g);
up to 10 parts by weight of constituent (h); and
20 to 60 parts by weight of constituent (i),
per 100 parts by weight of a sum of constituents (a) to (i).

13. A lubricating composition as claimed in claim 1, wherein surfactant (E) is present in an amount of 0.5 to 7% by weight relative to the total weight of the emulsion.

14. A lubricating composition as claimed in claim 1, wherein at least one unreactive linear polyorganosiloxane oil (F) is present.

15. A lubricating composition as claimed in claim 1, wherein at least one additive (G) is present.

16. A lubricating composition as claimed in claim 1, wherein additive (G) is present and comprises a biocide and a thickener.

17. A lubricating composition as claimed in claim 1, wherein at least one dehydrogeno-condensation catalyst (h) is present in an amount of 0.05 to 5 parts by weight relative to the total weight of the emulsion.

18. A lubricating composition as claimed in claim 1, wherein at least one unreactive linear polyorganosiloxane oil (F), and at least one additive (G) are present.

* * * * *